United States Patent
Lim et al.

(10) Patent No.: US 9,800,888 B2
(45) Date of Patent: Oct. 24, 2017

(54) METHOD FOR ENCODING AND DECODING IMAGES, AND DEVICE USING SAME

(71) Applicant: LG ELECTRONICS INC., Seoul (KR)

(72) Inventors: Jae Hyun Lim, Seoul (KR); Seung Wook Park, Seoul (KR); Jung Sun Kim, Seoul (KR); Yong Joon Jeon, Seoul (KR); Joon Young Park, Seoul (KR); Byeong Moon Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/442,257

(22) Filed: Feb. 24, 2017

(65) Prior Publication Data

US 2017/0163996 A1 Jun. 8, 2017

Related U.S. Application Data

(63) Continuation of application No. 15/148,689, filed on May 6, 2016, now Pat. No. 9,621,911, which is a continuation of application No. 14/848,485, filed on Sep. 9, 2015, now Pat. No. 9,369,729, which is a continuation of application No. 13/814,745, filed as
(Continued)

(51) Int. Cl.
| | |
|---|---|
| H04N 11/02 | (2006.01) |
| H04N 19/51 | (2014.01) |
| H04N 19/103 | (2014.01) |
| H04N 19/176 | (2014.01) |
| H04N 19/52 | (2014.01) |

(52) U.S. Cl.
CPC ........... *H04N 19/51* (2014.11); *H04N 19/103* (2014.11); *H04N 19/176* (2014.11); *H04N 19/52* (2014.11)

(58) Field of Classification Search
CPC ....................................................... H04N 19/51
See application file for complete search history.

(56) References Cited

U.S. PATENT DOCUMENTS

| | | | |
|---|---|---|---|
| 7,782,950 | B2 | 8/2010 | Jeon et al. |
| 8,144,881 | B2 | 3/2012 | Crockett et al. |
(Continued)

FOREIGN PATENT DOCUMENTS

| | | |
|---|---|---|
| CN | 17525859 A | 1/2006 |
| CN | 101411202 A | 4/2009 |
(Continued)

OTHER PUBLICATIONS

Kim, et al.: "CU-based Merge Candidate List Construction", XP030110400, JCTVC-G416, Joint Collaborative Team on Video Coding (JCT-VC) of ITU-T SG16 WP3 and ISO/IEC JTC1/SC29/WG11, 7th Meeting, Geneva, CH, Nov. 21-30, 2011.
(Continued)

*Primary Examiner* — Leron Beck
(74) *Attorney, Agent, or Firm* — Dentons US LLP

(57) ABSTRACT

According to the present invention, an inter-prediction method includes: receiving mode information on the inter-prediction of a current block; decoding the received mode information; and performing inter-prediction using the decoded mode information. According to the present invention, image compression efficiency may be improved.

14 Claims, 13 Drawing Sheets

Related U.S. Application Data application No. PCT/KR2011/008898 on Nov. 22, 2011, now Pat. No. 9,172,956.

(60) Provisional application No. 61/416,302, filed on Nov. 23, 2010.

(56) References Cited

U.S. PATENT DOCUMENTS

| | | | |
|---|---|---|---|
| 2003/0138052 A1* | 7/2003 | Dufour | H04N 19/00 375/240.27 |
| 2006/0017592 A1 | 1/2006 | Shim et al. | |
| 2007/0009026 A1* | 1/2007 | Kwon | H04N 19/176 375/240.03 |
| 2007/0291846 A1* | 12/2007 | Hussain | H04N 19/56 375/240.16 |
| 2008/0267292 A1 | 10/2008 | Ito et al. | |
| 2009/0087111 A1 | 4/2009 | Noda et al. | |
| 2009/0213249 A1* | 8/2009 | Ikeda | H04N 5/3572 348/241 |
| 2009/0220109 A1 | 9/2009 | Crockett et al. | |
| 2009/0279608 A1 | 11/2009 | Jeon et al. | |
| 2010/0220790 A1 | 9/2010 | Jeon et al. | |
| 2013/0034171 A1* | 2/2013 | Winken | H04N 19/597 375/240.25 |
| 2014/0286395 A1* | 9/2014 | Lee | H04N 19/137 375/240.02 |

FOREIGN PATENT DOCUMENTS

| | | |
|---|---|---|
| CN | 101617537 A | 12/2009 |
| EP | 1619901 A2 | 1/2006 |
| EP | 2003897 A2 | 12/2008 |
| EP | 2011234 B1 | 12/2010 |
| JP | 2003-244704 A | 8/2003 |
| KR | 10-2006-0007786 A | 1/2006 |
| KR | 10-2008-0022055 A | 3/2008 |
| KR | 10-2010-0081984 A | 7/2010 |
| WO | 2007/114368 A1 | 10/2007 |
| WO | 2008/023968 A1 | 2/2008 |
| WO | 2009/051419 A3 | 6/2009 |

OTHER PUBLICATIONS

Suzuki: "CE9: 3.1 PU Merge & Skip tools and proposed improvements", XP030008273, JCTVC-D233, Joint Collaborative Team on Video Coding (JCT-VC) of ITU-T SG16 WP3 and ISO/IEC JTC1/SC29/WG11, 4th Meeting, Daegu, KR, Jan. 20-28, 2011.

Bross: "CE9: Motion Vector Coding test Report by Fraunhofer HHI", XP030008354, JCTVC-D314, Joint Collaborative Team on Video Coding (JCT-VC) of ITU-T SG16 WP3 and ISO/IEC JTC1/SC29/WG11, 4th Meeting, Daegu, KR, Jan. 20-28, 2011.

JCT-VC: "Test Model under Consideration", Joint Collaborative team on Video Coding of ITU-T SG16 WP3 and ISO/IEC SC29/WG11 3rg Meeting, XP0055227002, Guangzhou, CN, Oct. 6, 2010.

I. Kim, et al.: "TE11: report on experiment 3.2.c: Check skip and merge together", Joint Collaborative team on Video Coding of ITU-T SG16 WP3 and ISO/IEC JTC1/SC29/WG11 3rg Meeting, XP030007906, Guangzhou, CN, Oct. 2, 2010.

Jeong, et al.: "TE11: Cross-check result of merge/skip (3.2c)", Joint Collaborative team on Video Coding of ITU-T SG16 WP3 and ISO/IEC JTC1/SC29/WG11 3rg Meeting, XP030007898, Guangzhou, CN, Oct. 1, 2010.

Joel Jung: "TE11: Summary report for TE11 on motion vector coding", Joint Collaborative team on Video Coding of ITU-T SG16 WP3 and ISO/IEC JTC1/SC29/WG11 3rg Meeting, XP0055227088, Guangzhou, CN, Oct. 8, 2010.

International Search Report dated May 1, 2012 for Application No. PCT/KR2011/008898 with English translation, 4 pages.

Korean Office Action dated Jan. 20, 2014 for Application No. 10-2013-7000268, 4 pages.

Office Action dated Apr. 29, 2015 from corresponding Chinese Patent Application No. 201180041402.0, 6 pages.

* cited by examiner

METHOD FOR ENCODING AND DECODING IMAGES, AND DEVICE USING SAME

This application is a Continuation of U.S. application Ser. No. 15/148,689, filed May 6, 2016, which is a Continuation of U.S. application Ser. No. 14/848,485, filed on Sep. 9, 2015, now U.S. Pat. No. 9,369,729 issued Jun. 14, 2016, which is a Continuation of U.S. application Ser. No. 13/814,745, filed Feb. 7, 2013, now U.S. Pat. No. 9,175,956 issued Oct. 27, 2015, which is a National Stage of International Application No. PCT/KR2011/008898, filed Nov. 22, 2011, and claims benefit of U.S. Application No. 61/416,302, filed Nov. 23, 2010, all of which are hereby incorporated by reference in their entirety for all purposes as if fully set forth herein.

TECHNICAL FIELD

The present invention relates to image processing, and more particularly, to an inter prediction method and apparatus.

BACKGROUND ART

Recently, demands on high-resolution and high-quality images such as High Definition (HD) images and Ultra High Definition (UHD) images are increased in various fields. As image data include more high-resolution and high-quality images, compared to typical image data, the amount of information and the amount of bits for transmission are relatively increased. Therefore, when image data are stored using a medium such as an existing wired/wireless broadband line or image data are stored using an existing storage medium, transmission costs and storage costs are increased. In order to resolve such limitations, high-efficiency image compression techniques may be used.

The Image compression techniques include an inter prediction technique for predicting pixel values in a current picture from the previous and/or following pictures of the current picture, an intra prediction for predicting pixel values in a current picture by using pixel information in the current picture, and an entropy encoding technique for allocating a short codeword to a high frequency value and a long codeword to a low frequency value. By using such image compression techniques, image data may be effectively compressed for transmission or storage.

DISCLOSURE

Technical Problem

The present invention provides a video encoding method and apparatus for improving image compression efficiency.

The present invention also provides a video decoding method and apparatus for improving image compression efficiency.

The present invention also provides an image information transmitting method and apparatus for improving image compression efficiency.

The present invention also provides an inter prediction method and apparatus for improving image compression efficiency.

Technical Solution (1) An exemplary embodiment of the present invention provides a method for transmitting image information. The method includes performing an inter prediction on a current block, encoding mode information on the inter prediction of the current block, and transmitting the encoded mode information. Here, the mode information may comprise residual flag information indicating whether there is a residual signal for the current block and merge flag information indicating whether a merge mode is applied to the current block.

(2) Another exemplary embodiment of the present invention provides a method for an inter prediction method. The method includes receiving mode information on an inter prediction of a current block, decoding the received mode information, and performing an inter prediction on the current block on the basis of the decoded mode information. Here, the mode information may comprise residual flag information indicating whether there is a residual signal for the current block and merge flag information indicating whether a prediction mode for the current block is a merge mode.

(3) In (2), the performing of the inter prediction may include selecting a block used for deriving motion information of the current block from a plurality of candidate blocks constituting a candidate block list, by using the decoded mode information, and deriving motion information of the current block by using the selected block. Here, the candidate block list may have the same configuration regardless of whether there is a residual signal for the current block.

(4) In (3), the candidate block list may include left neighboring blocks adjacent to the current block, top neighboring blocks adjacent to the current block, the right top corner block of the current block, the left top corner block of the current block, the left bottom corner block of the current block, and a co-located block of the current block.

(5) In (4), the candidate block list may include the bottom-most block among neighboring blocks adjacent to the left of the current block, the right-most block among neighboring blocks adjacent to the top of the current block, the right top corner block of the current block, the left top corner block of the current block, the left bottom corner block of the current block, and a co-located block of the current block.

(6) In (3), the derived motion information may be one of L0 motion information, L1 motion information, and Bi motion information.

(7) In (2), if there is no residual signal for the current block, the decoding of the mode information may include deriving a residual value for lura component and a residual value for chroma component as 0.

(8) In (2), the decoding of the mode information may include decoding the residual flag information prior to the merge flag information.

(9) In (2), the decoding of the mode information may include decoding the merge flag information prior to the residual flag information, and decoding the residual flag information only when the decoded merge flag information indicates that the prediction mode for the current block is a merge mode.

(10) Still another exemplary embodiment of the present invention provides a method for decoding an image. The method includes receiving mode information on an inter prediction of a current block, decoding the received mode information, generating a prediction block by performing an inter prediction on the current block on the basis of the decoded mode information, and generating a reconstructed block by using the generated prediction block. Here, the mode information may comprise residual flag information indicating whether there is a residual signal for the current block and a prediction mode for the current block is a merge mode.

(11) In (10), the performing of the inter prediction may further include selecting a block used for deriving motion information of the current block from a plurality of candidate blocks constituting a candidate block list, by using the decoded mode information, and deriving motion information of the current block by using the selected block. Here, the candidate block list may have the same configuration regardless of whether there is a residual signal for the current block.

(12) In (11), the candidate block list may include left neighboring blocks adjacent to the current block, top neighboring blocks adjacent to the current block, the right top corner block of the current block, the left top corner block of the current block, the left bottom corner block of the current block, and a co-located block of the current block.

(13) In (12), the candidate block list may include the bottom-most block among neighboring blocks adjacent to the left of the current block, the right-most block among neighboring blocks adjacent to the top of the current block, the right top corner block of the current block, the left top corner block of the current block, the left bottom corner block of the current block, and a co-located block of the current block.

(14) In (10), the decoding of the mode information may include decoding the residual flag information prior to the merge flag information.

Advantageous Effects

According to the video encoding method of the present invention, image compression efficiency can be improved.

According to the video decoding method of the present invention, image compression efficiency can be improved.

According to the image information transmitting method of the present invention, image compression efficiency can be improved.

According to the inter prediction method of the present invention, image compression efficiency can be improved.

BEST MODE

Figure 1:
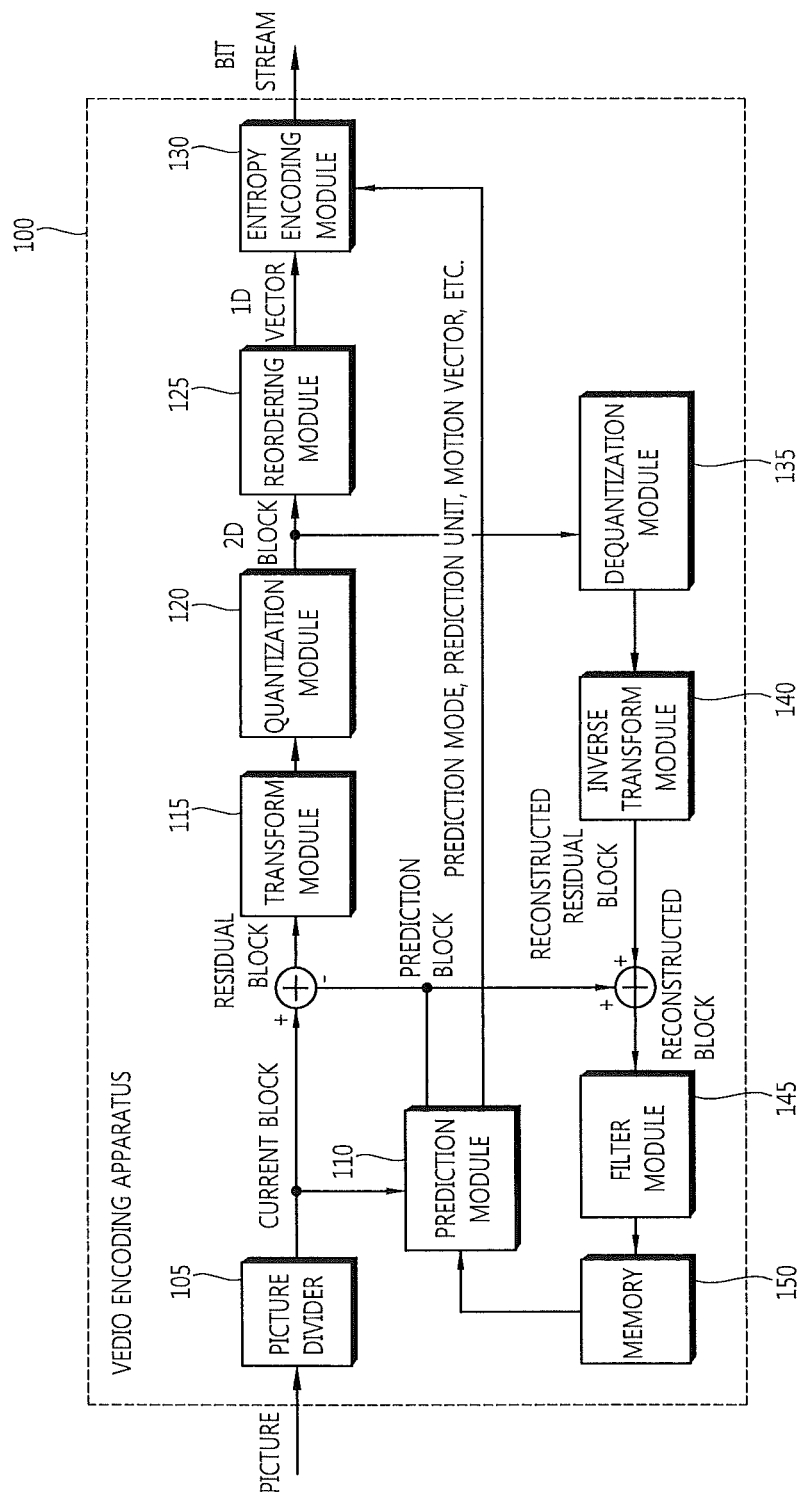
FIG. 1 is a block diagram illustrating a video encoding apparatus according to an embodiment of the present invention.

The present invention may be embodied with many different modifications and thus may include several embodiments. Therefore, specific embodiments will be shown in the drawings and described in detail. However, this does not intend to limit the specific embodiments of the present invention. The terms herein are used only for explaining the specific embodiments of the present invention while not limiting the technical idea of the present invention. A singular form used for the terms herein may include a plural form unless being clearly different from the context. In this specification, the meaning of "include," "comprise," "including," or "comprising," specifies a property, a region, a fixed number, a step, a process, an element and/or a component but does not exclude other properties, regions, fixed numbers, steps, processes, elements and/or components.

On the other hand, each component on the drawings described herein is separately provided for convenience of description on different feature functions in a video encoding/decoding apparatus, and is not limited to being implemented with separate hardware or software. For example, at least two components may be combined to constitute one component, or one component may be split into several components. Embodiments including unified and/or separated components are included in the scope of the present invention without departing from the sprit of the present invention.

Additionally, some components may not be essential components for performing essential functions and may be selective components for improving performance. The present invention may be realized only including essential components for realizing the essentials of the present invention, which exclude components used for performance improvement, and a structure including essential components that exclude selective components for performance improvement is included in the scope of the present invention.

Hereinafter, with reference to the accompanying drawings, preferred embodiments of the present invention will be described in more detail. Hereinafter, like reference numerals refer to like elements throughout, and their overlapping descriptions will be omitted.

FIG. 1 is a block diagram illustrating a video encoding apparatus according to an embodiment of the present invention. Referring to FIG. 1, the video encoding apparatus 100 may include a picture divider 105, a prediction module 110, a transform module 115, a quantization module 120, a reordering module 125, an entropy encoding module 130, an dequantization module 135, an inverse transform module 140, a filter module 145, and a memory 150.

The picture divider 105 may divide an inputted picture into at least one processing unit. At this point, the processing unit may be a Prediction Unit (PU), a Transform Unit (TU), or a Coding Unit (CU).

The prediction module 110, as described below, may include an inter prediction module for performing inter prediction and an intra prediction module for performing intra prediction. The prediction module 110 performs prediction on the processing unit of a picture in the picture divider 105 in order to generate a prediction block. The processing unit of a picture in the prediction module 110 may be a CU, a TU, or a PU. Additionally, after determination is made on whether prediction performed on a corresponding processing unit is inter prediction or intra prediction, the specific details of each prediction method (for example, a prediction mode) may be determined. At this point, the processing unit for performing prediction may be different from that for determining a prediction method and specific details. For example, a prediction method and a prediction mode may be determined in a PU unit and prediction may be performed in a TU unit. A residual value (for example, a residual block) between a generated prediction block and an original block may be inputted to the transform module 115. Additionally, prediction mode information and motion vector information used for prediction may be encoded together with a residual value in the entropy encoding module 130, and then delivered to a decoder.

The transform module 115 performs transformation on a residual block in a TU unit and generates transform coefficients. The transform module 115 may use a TU for transformation and may have a quad tree structure. At this point, the size of a TU may be determined within a range of a predetermined maximum and minimum size. The transform module 115 may transform a residual block through Discrete Cosine Transform (DCT) and/or Discrete Sine Transform (DST).

The quantization module 120 may generate quantization coefficients by quantizing the residual values transformed by the transform module 115. The value calculated by the quantization module 120 is provided to the dequantization module 135 and the reordering module 125.

The reordering module 125 reorders the quantization coefficients provided from the quantization module 120. By reordering the quantization coefficients, the encoding efficiency in the entropy encoding module 130 can be improved. The reordering module 125 may reorder the quantization coefficients of a two dimensional block form in a one dimensional vector form through a coefficient scanning method. The reordering module 125 may change the order of coefficient scanning on the basis of stochastic statistics of the transmitted coefficients from the quantization module 120, thereby improving the entropy encoding efficiency in the entropy encoding module 130.

The entropy encoding module 130 may perform entropy encoding on the quantization coefficients reordered by the reordering module 125. The entropy encoding module 130 may encode various information such as quantization coefficient information and block type information of a CU, prediction mode information, partition unit information, PU information and transmission unit information, motion vector information, reference picture information, interpolation information of a block, and filtering information, which are delivered from the reordering module 125 and the prediction module 110.

The entropy encoding may use an encoding method such as Exponential Golomb, Context-Adaptive Variable Length Coding (CAVLC), and Context-Adaptive Binary Arithmetic Coding (CABAC). For example, the entropy encoding module 130 may store a table for performing entropy encoding, for example, a Variable Length Coding (VLC) table, and also may perform entropy encoding by using the stored VLC table. As another example, according to a CABAC entropy encoding method, the entropy encoding module 130 binarizes a symbol and converts it into bins, and performs arithmetic encoding on the bins according to the occurrence probability of the bins in order to generate bit stream.

When entropy encoding is applied, an index of a low value and a short codeword corresponding thereto may be allocated to a symbol having a high occurrence probability and an index of a high value and a long codeword corresponding thereto may be allocated to a symbol having a low occurrence probability. Accordingly, the amount of bit for encoding target symbols may be reduced and image compression performance may be improved through entropy encoding.

The dequantization module 135 dequantizes the values quantized by the quantization module 120, and the inverse transform module 140 inverse-transforms the value dequantized by the dequantization module 135. The residual value generated by the dequantization module 135 and the inverse transform module 140 may be added to the prediction block predicted by the prediction module 110 in order to generate a reconstructed block.

The filter module 145 may apply a deblocking filter and/or an Adaptive Loop Filter (ALF) to a reconstructed picture.

The deblocking filter may remove block distortion occurring at the boundary between blocks in the reconstructed picture. The ALF may perform filtering on the basis of a value obtained by comparing a reconstructed image with an original image after a block is filtered through the deblocking filter. The ALF may be used only when high efficiency is applied.

Meanwhile, the filter module 145 may not apply filtering on a reconstructed block used for inter prediction The memory 150 may store the reconstructed block or picture calculated by the filter module 145. The reconstructed block or picture stored in the memory 150 may be provided to the prediction module 110 which performs inter prediction.

The Coding Unit (CU) is a unit in which encoding/decoding of a picture is performed, has a depth and is split on the basis of a quad tree structure. The CU may have several sizes such as 64×64, 32×32, 16×16, and 8×8.

An encoder may transmit information on a Largest Coding Unit (LCU) and a Smallest Coding Unit (SCU) to a decoder. In addition to the information on an LCU and an SCU, information on the number of available division (i.e. depth information) may be transmitted to a decoder. Information on whether the CU is divided on the basis of a quad tree structure may be transmitted from an encoder to a decoder through flag information such as a split flag.

One CU may be divided into a plurality of PUs. When intra prediction is performed, a prediction mode may be determined in a PU unit and a prediction may be performed in the PU unit. At this point, a prediction mode may be determined by a PU and an intra picture prediction may be performed in a TU unit.

Figure 2:
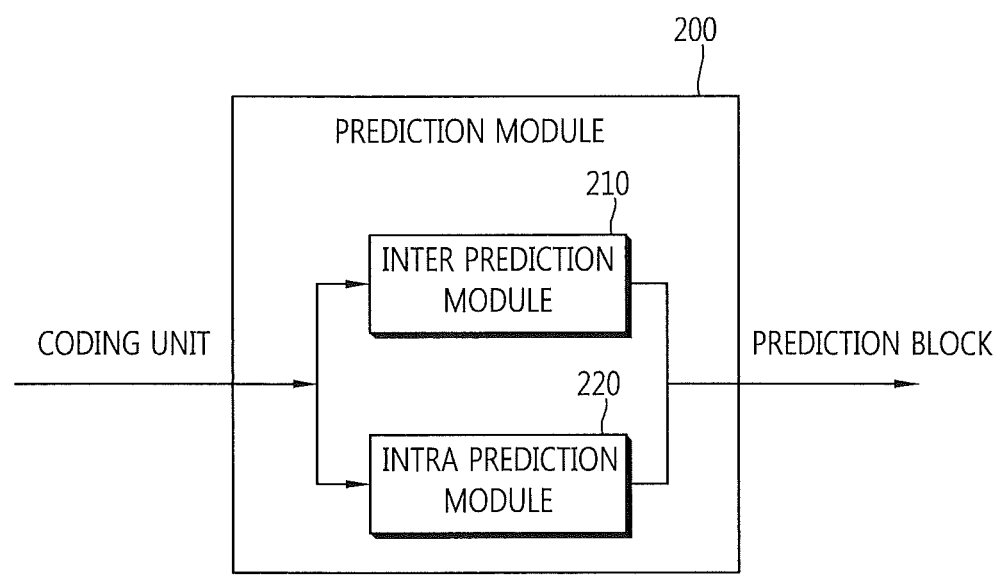
FIG. 2 is a conceptual diagram illustrating a prediction module according to an embodiment of the present invention.

FIG. 2 is a conceptual diagram illustrating a prediction module according to an embodiment of the present invention. Referring to FIG. 2, the prediction module 200 may include an inter prediction module 210 and an intra prediction module 220.

The inter prediction module 210 may perform prediction on the basis of information on at least one picture among the previous pictures and/or following pictures of a current picture in order to generate a prediction block. Additionally, the intra prediction module 220 may perform prediction on the basis of pixel information on a current picture in order to generate a prediction block.

The inter prediction module 210 may select a reference picture with respect to a PU, and may select a reference block having the same size as the PU, as an integer pixel sample unit. Then, the inter prediction module 210 may generate a prediction block by a sample unit of less than an integer such as a ½ pixel sample unit and a ¼ pixel sample unit. The prediction block may be the most similar to a current PU so that a residual signal is minimized and an encoded motion vector size is also minimized. At this point, a motion vector may be expressed with a unit of less than an integer pixel, and for example, may be expressed with a ¼ pixel unit with respect to a luma pixel and expressed with a ⅛ pixel unit with respect to a chroma pixel.

Information on the index of the reference picture and motion vector selected by the inter prediction module 210 may be encoded and delivered to a decoder.

Figure 3:
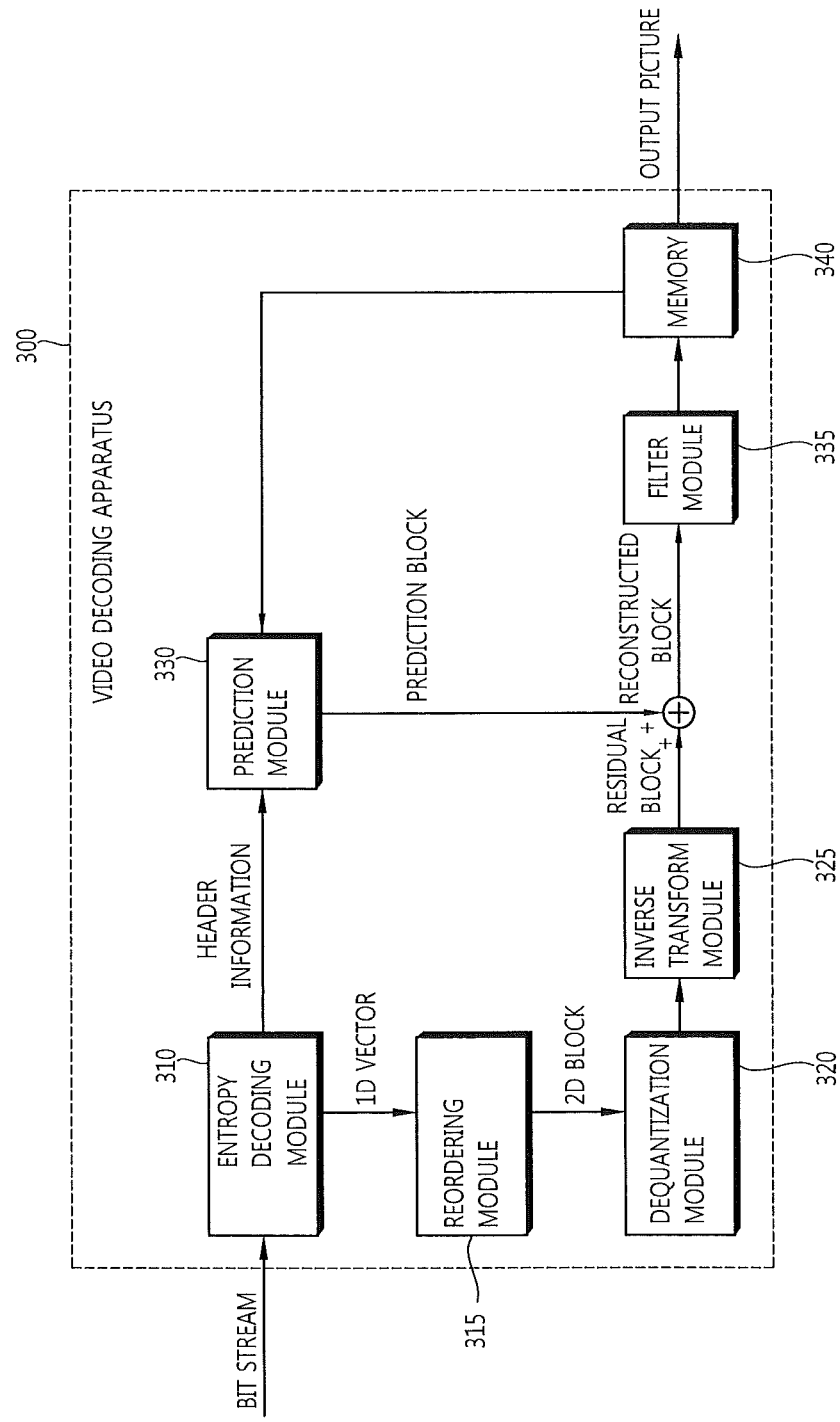
FIG. 3 is a block diagram illustrating a video decoding apparatus according to an embodiment of the present invention.

FIG. 3 is a block diagram illustrating a video decoding apparatus according to an embodiment of the present invention. Referring to FIG. 3, the video decoding apparatus 300 may include an entropy decoding module 310, a reordering module 315, an dequantization module 320, an inverse transform module 325, a prediction module 330, a filter module 335, and a memory 340.

When an image bit stream is inputted into a video encoding apparatus, the bit stream may be decoded in the video decoding apparatus in accordance with an image processing procedure.

The entropy decoding module 310 may perform entropy decoding on the inputted bit stream and an entropy decoding method is similar to the above-mentioned entropy encoding method. For example, when Variable Length Coding (VLC) such as CAVLC is used in order to perform entropy encoding in a video encoding apparatus, the entropy decoding module 310 may perform entropy decoding with the same VLC table as that used in the video encoding apparatus. When the CABAC is used in order to perform entropy encoding in a video encoding apparatus, the entropy decoding module 310 may perform entropy decoding through the CABAC in correspondence thereto.

When entropy decoding is applied, an index of a low value and a short codeword corresponding thereto may be allocated to a symbol having a high occurrence probability and an index of a high value and a long codeword corresponding thereto may be allocated to a symbol having a low occurrence probability. Accordingly, the amount of bits for encoding target symbols may be reduced and image compression performance may be improved through entropy encoding.

Information for generating a prediction block among information decoded in the entropy decoding module 310 may be provided to the prediction module 330, and residual value obtained through entropy decoding in the entropy decoding module 410 may be inputted to the reordering module 315.

The reordering module 315 may reorder the bit stream entropy-decoded by the entropy decoding module 310 on the basis of a reordering method of a video encoding apparatus. The reordering module 315 may reconstruct coefficients in a one directional vector form into those in a second dimensional block form in order for reordering. The reordering module 315 receives information relating to the coefficient scanning performed by an encoder and performs reordering through a method that performs inverse scanning on the basis of the scanning order performed by a corresponding encoding unit.

The dequantization module 320 may perform dequantization on the basis of a quantization parameter provided from an encoder and a coefficient value of a reordered block.

The inverse transform module 325 may perform inverse DCT and/or inverse DST on DCT and DST that a transform module of an encoder performs, with respect to a quantization result of a video encoding apparatus. Inverse transformation may be performed based on a transmission unit or an image partition unit determined by an encoder. DCT and/or DST in a transform module of an encoder may be selectively performed according to several information such as a prediction method, the size of a current block, and a prediction direction, and the inverse transform module 325 of a decoder may perform inverse transform on the basis of information on the transform performed by a transform module of an encoder.

The prediction module 330 may generate a prediction block on the basis of the prediction block generation related information provided from the entropy decoding module 310 and the previously decoded block and/or picture information provided from the memory 340. A reconstructed block may be generated by using a prediction block generated by the prediction module 330 and a residual block provided from the inverse transform module 325.

The reconstructed block and/or picture may be provided to the filter module 335. The filter module 335 may apply deblocking filtering, Sample Adaptive Offset (SAO), and/or adaptive loop filtering on the reconstructed block and/or picture.

The memory 340 may store the reconstructed picture or block in order to use it as a reference picture or a reference block, or may provide the reconstructed picture to an output module.

Figure 4:
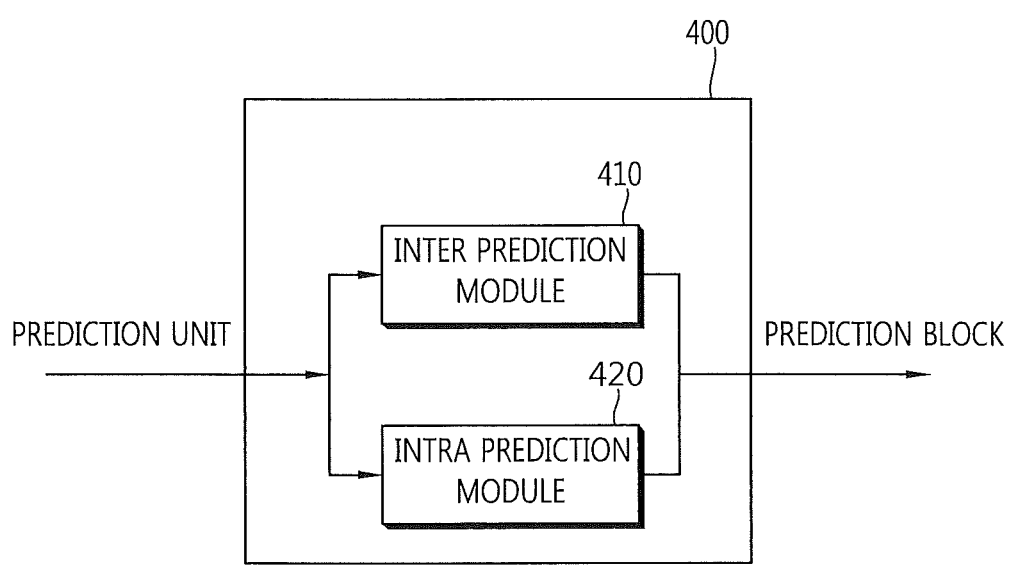
FIG. 4 is a conceptual diagram illustrating a prediction module of a video decoding apparatus according to an embodiment of the present invention.

FIG. 4 is a conceptual diagram illustrating a prediction module of a video decoding apparatus according to an embodiment of the present invention.

Referring to FIG. 4, the prediction module 400 may include an intra prediction module 410 and an inter prediction module 420.

When a prediction mode for a corresponding PU is an intra prediction mode (for example, an intra picture prediction mode), the intra prediction module 410 may generate a prediction block on the basis of pixel information in a current picture.

When a prediction mode for a corresponding prediction unit is an inter prediction mode (for example, an inter picture prediction mode), the inter prediction module 420 performs inter prediction on a current prediction unit by using information necessary for the inter prediction of a current PU provided from a video encoding apparatus, for example, information on a motion vector and a reference picture index, on the basis of information included in at least one picture among the previous pictures or following pictures of a current picture including a current PU.

At this point, after the skip flag and the merge flag received from an encoding unit are confirmed, motion information may be derived according thereto.

Hereinafter, according to the configuration or expression of the present invention, when "image" or "screen" represents the same meaning of "picture", "picture" may be described as "image" or "screen". Additionally, inter prediction and inter picture prediction have the same meaning and inter prediction and inter picture prediction have the same meaning.

Meanwhile, when inter prediction is performed on a current block, in order to reduce the amount of transmission information according to prediction, a prediction mode such as a merge mode, a direct mode, and/or a skip mode may be used.

In a merge mode, a current block may be merged into a vertical or horizontal adjacent another block. Here, "being merged" refers to obtaining motion information from motion information of adjacent block during inter prediction of a current block. Hereinafter, a block adjacent to a current block is referred to as a neighboring block of the current block.

Merge related information on a current block may include information on whether the prediction mode of a current block is a merge mode and information on with which neighboring block among adjacent neighboring blocks a current block is merged. Hereinafter, information which represents whether the prediction mode of a current block is a merge mode is referred to as a merge flag and information on with which neighboring block among adjacent neighboring blocks a current block is merged is referred to as a merge index. For example, the merge flag may be represented with merge_flag and the merge index may be represented with merge_index. At this point, the merge index may be obtained only when the merge flag indicates that a prediction mode is a merge mode (for example, merge_flag=1).

The inter prediction in a merge mode may be performed by a CU and a merge in this case may be called as a CU merge. As another example, the inter prediction in a merge mode may be performed by a PU and a merge in this case may be called as a PU merge.

A skip mode is a prediction mode in which transmission of a residual signal, namely a difference between a prediction block and a current block, is omitted. In a skip mode, a value of a residual signal between a prediction block and a current block may be 0. Accordingly, in a skip mode, an encoder may not transmit a residual signal to a decoder, and a decoder may generate a prediction block by using only motion information among a residual signal and the motion information. In a skip mode, an encoder may transmit motion information to a decoder. At this point, motion information may be transmitted in such a method of using motion vector information on a corresponding block for a current block by specifying one of neighboring blocks adjacent to a current block.

A direct mode is a prediction mode for driving motion information by using an encoding/decoding completed block among neighboring blocks adjacent to a current block. At this point, an encoder may not transmit motion information itself to a decoder.

Figure 5:
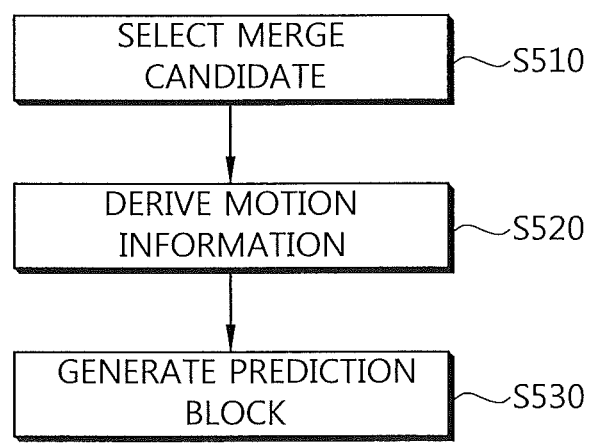
FIG. 5 is a flowchart illustrating an inter prediction method in a merge mode according to an embodiment of the present invention.

FIG. 5 is a flowchart illustrating an inter prediction method in a merge mode according to an embodiment of the present invention. The embodiment of FIG. 5 may be applied to an encoder and a decoder, and the decoder therein will be mainly described for convenience of description.

Referring to FIG. 5, a decoder may select a merge candidate used for motion information derivation of a current block among merge candidates constituting a merge candidate list in operation 5510. As one embodiment, a decoder may select a merge candidate that a merge index transmitted from an encoder indicates as a merge candidate used for deriving motion information of a current block. Embodiments of merge candidates included in a merge candidate list will be described with reference to FIGS. 6 to 8.

A decoder may derive motion information on a current block by using the selected merge candidate in operation 5520. For example, the decoder may use motion information of the selected merge candidate as motion information of the current block.

Two reference picture lists may be used for inter prediction, and may include a reference picture list0 and a reference picture list1. An inter prediction using a reference picture selected from the reference picture list0 may be called an L0 prediction and the L0 prediction is mainly used for forward prediction. An inter prediction using a reference picture selected from the reference picture list1 may be called an L1 prediction and the L1 prediction is mainly used for backward prediction. Additionally, an inter prediction using two reference pictures selected from the reference picture list0 and the reference picture list1 may be referred to as bi prediction. Motion information used for L0 prediction may be referred to as L0 motion information, and motion information used for L1 prediction may be referred to as L1 motion information, and motion information used for bi prediction may be referred to as bi motion information.

Motion information on a selected merge candidate block may be L0 motion information, L1 motion information, or bi motion information. Accordingly, the L0 motion information, the L1 motion information, or the bi motion information of merge candidate block may be used as motion information on a current block.

When motion information on a current block is derived, the encoder may generate a prediction block for current block by using the derived motion information in operation S530.

Figure 6:
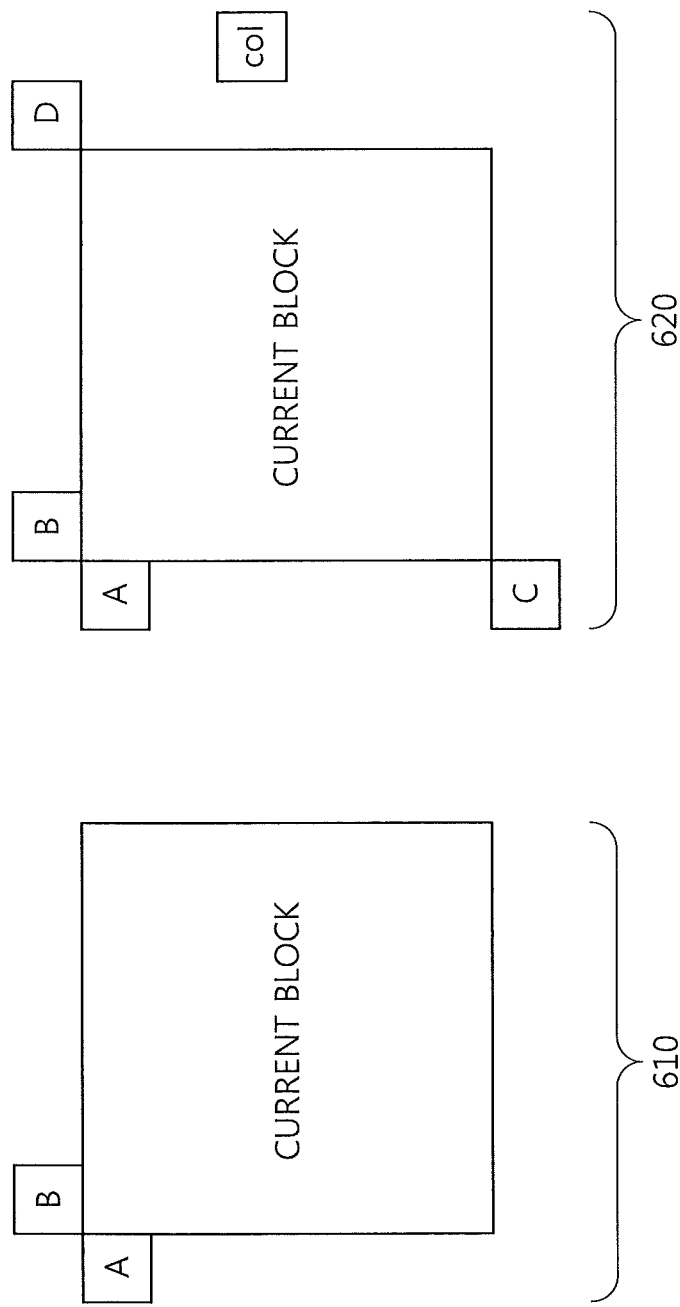
FIG. 6 is a conceptual diagram illustrating merge candidates in a merge candidate list according to an embodiment of the present invention.

FIG. 6 is a conceptual diagram illustrating merge candidates included in a merge candidate list according to an embodiment of the present invention.

As mentioned above, when the merge mode is applied, motion information on a current block may be derived using motion information on one of candidate blocks included in a merge candidate list. For example, motion information on one of candidate blocks in a merge candidate list may be used as motion information on a current block. At this point, a residual signal may be transmitted together with motion information, and when the pixel value of a prediction block is used as that of a current block, a residual signal may not be transmitted.

Referring to 610 of FIG. 6, the left neighboring block A at the left of the current block and the top neighboring block B at the top of the current block may be used as merge candidates. At this point, as shown in FIG. 6, the left neighboring block of the current block may be the top-most block among blocks adjacent to the left of the current block and the top neighboring block of the current block may be the left-most block among blocks adjacent to the top of the current block.

Referring to 620 of FIG. 6, as shown in 610, the left neighboring block A of the current block or the top neighboring block B of the current block may be used as a merge candidate. At this point, as shown in FIG. 6, the left neighboring block of the current block may be the top-most block among blocks adjacent to the left of the current block and the top neighboring block of the current block may be the left-most block among blocks adjacent to the top of the current block. Also, the left bottom corner block C and/or the right top corner block D may be used as a merge candidate included in a merge candidate list. Additionally, the co-located block (col) may be used as a merge candidate included in a merge candidate list. Here, the co-located block refers to a block at the same position as the current block among blocks in a reference picture.

Figure 7:
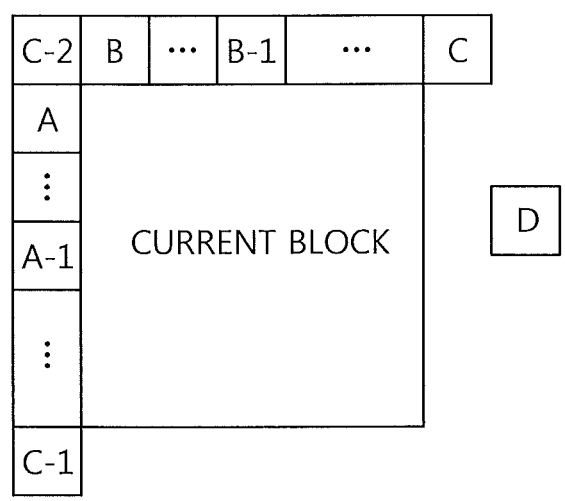
FIG. 7 is a conceptual diagram illustrating merge candidates in a merge candidate list according to another embodiment of the present invention.

FIG. 7 is a conceptual diagram illustrating merge candidates in a merge candidate list according to another embodiment of the present invention.

Referring to FIG. 7, the left neighboring block A of the current block and/or the top neighboring block B of the current block may be used as a merge candidate. At this point, as shown in FIG. 7, the left neighboring block of the current block may be the top-most block among blocks adjacent to the left of the current block and the top neighboring block of the current block may be the left-most block among blocks adjacent to the top of the current block. Also, the left bottom corner block C-1 and/or the right top corner block C and/or the left top corner block C-2 may be used as a merge candidate included in a merge candidate list. Additionally, the co-located block D may be used as a merge candidate included in a merge candidate list.

In the merge candidate list, the block B-1 selected from blocks adjacent to the top of the current block may be included as a merge candidate. For example, the selected block, as an available block among neighboring blocks adjacent to the top of the current block, may be a block having the same reference picture index as the current block. In the merge candidate list, the block A-1 selected from blocks adjacent to the left of the current block may be included as a merge candidate. For example, the selected block, as an available block among neighboring blocks adjacent to the left of the current block, may be a block having the same reference picture index as the current block.

Figure 8:
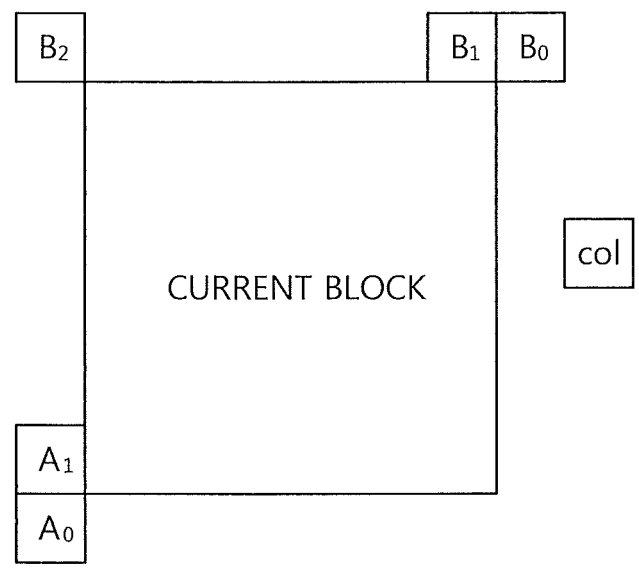
FIG. 8 is a conceptual diagram illustrating merge candidates in a merge candidate list according to another embodiment of the present invention.

FIG. 8 is a conceptual diagram illustrating merge candidates in a merge candidate list according to another embodiment of the present invention.

Referring to FIG. 8, the left bottom corner block $A_0$, the right top corner block $B_0$, and/or the left top corner block $B_2$ may be used as a merge candidate included in a merge candidate list. Additionally, in the merge candidate list, the left neighboring block $A_1$ of the current block and/or the top neighboring block $B_1$ of the current block may be included as a merge candidate. At this point, the left neighboring block $A_1$ may be the bottom-most block among blocks adjacent to the left of the current block and the top neighboring block $B_1$ may be the right-most block among blocks adjacent to the top of the current block. The co-located block col may be used as a merge candidate included in a merge candidate list.

Referring to the embodiments of FIGS. 6 to 8, a method of selecting merge candidates included in a merge candidate list may be variously expanded. The encoder and decoder may configure the merge candidate list by selecting merge candidates according to the embodiments of FIGS. 6 to 8. At this point, when merge candidates are selected, the encoder and decoder may exclude redundant candidates in order to reduce redundancy and then may configure a merge candidate list.

Referring to the embodiments of FIGS. 6 to 8, the number of merge candidates constituting a merge candidate list may be limited to less than the predetermined number.

For example, it is assumed in the embodiment of FIG. 7 that the maximum number of merge candidates is 4 and merge candidates are added to and/or inserted into a merge candidate list in the order of {A, B, C, C-1, D, . . . }. At this point, if the blocks A, B, C, C-1, and D are all available, only the blocks A, B, C, and C-1 may be determined as merge candidates included in the merge candidate list. If the blocks A, B, C-1, and D are available and the block C is unavailable, only the blocks A, B, C-1, and D may be determined as merge candidates included in the merge candidate list.

As another example, it is assumed in the embodiment of FIG. 8 that the maximum number of merge candidates is 5 and merge candidates are added to and/or inserted into a merge candidate list in the order of $\{A_0, A_1, B_0, B_1, B_2, \text{col}\}$. At this point, if the blocks $A_0, A_1, B_0, B_1, B_2$, and col are all available, only the blocks $A_0, A_1, B_0, B_1$, and $B_2$ may be determined as merge candidates included in the merge candidate list. If the blocks $A_0, A_1, B_0, B_2$, and col are available and the block $B_1$ is unavailable, only the blocks $A_0, A_1, B_0, B_2$, and col may be determined as merge candidates included in the merge candidate list.

As another example, it is assumed in the embodiment of FIG. 8 that the maximum number of spatial merge candidates selected in a current picture is limited to 4 and a co-located block (col) selected from a reference picture can always be used as a merge candidate. Additionally, it is assumed that spatial merge candidates are added to and/or inserted into the merge candidate list in the order of $A_1, B_1, B_0, A_0$, and $B_2$. At this point, if the blocks $B_1, B_0, A_0$, and $B_2$ are available among spatial merge candidates and the blocks $A_1$ is unavailable, only the blocks $B_1, B_0, A_0$, and $B_2$ may be determined as merge candidates included in the merge candidate list. Therefore, in addition to the co-located block, the blocks $B_1, B_0, A_0, B_2$, and Col may be determined as merge candidates included in a merge candidate list.

Figure 9:
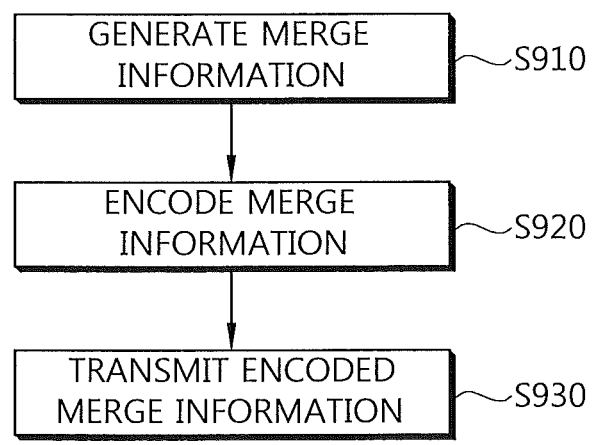
FIG. 9 is a conceptual diagram illustrating a method of transmitting merge information in an encoder according to an embodiment of the present invention.

FIG. 9 is a conceptual diagram illustrating a method of transmitting merge information in an encoder according to an embodiment of the present invention. The merge information may include a merge flag, a merge index, and/or residual information. Once the merge information is generated, the encoder may transmit the generated information to a decoder.

Referring to FIG. 9, the encoder may generate merge information in operation S910.

The merge information may include a merge flag. As mentioned above, the merge flag may indicate whether a prediction mode for current block is a merge mode. As one example, the merge flag may be represented with merge_flag. The encoder assigns 1 to merge_flag when the prediction mode for current block is a merge mode and assigns 0 to merge_flag when the prediction mode for current block is not a merge mode.

The merge information may include a merge index. As mentioned above, the merge index indicates with which neighboring block among adjacent neighboring blocks a current block is merged. As one example, the merge index may be represented with merge_index. When the merge flag indicates that a prediction mode for current block is not a merge, merge index information on the current block may not be generated.

As shown in 610 of the above-mentioned embodiment of FIG. 6, if the number of merge candidates is 2, a merge index needs to indicate one of two merge candidates. Therefore, the merge index may be used as a flag having two values. At this point, for example, the merge index may have only the values of 0 and 1.

However, when the merge candidate is expanded as shown in the remaining embodiments except 610 of FIG. 6 among the embodiments of FIGS. 6 to 8, flag information having only two values may not indicate with which block among merge candidate blocks a current block is merged. Accordingly, at this point, a method of using a merge index may vary, as mentioned below.

As one embodiment, the number of merge candidates that a merge index indicates may be differently set according to the number of merge candidates constituting a merge candidate list.

For example, when the number of available merge candidates for current block is 3, the number of merge candidates that the merge index indicates may be 3. At this point, one of the values 0, 1, and 2 may be assigned to the merge index. The merge index may indicate a merge candidate used for deriving the motion information of the current block among three merge candidates by using the assigned value.

As another example, when the number of available merge candidates for current block is 2, the number of merge candidates that the merge index can indicate may be 2. At this point, one of the values 0 and 1 may be assigned to the merge index and the merge index may indicate a merge candidate used for deriving the motion information of the current block among two merge candidates by using the assigned value.

As another embodiment, when the maximum number of merge candidates constituting a merge candidate list is limited to below a predetermined number, the number of merge candidates that the merge index may indicate is set with the maximum number.

For example, when the maximum number of merge candidates is 4, the number of merge candidates that the merge index may indicate may be 4. At this point, one of the values 0, 1, 2, and 3 may be assigned to the merge index. The merge index may indicate a merge candidate used for deriving the motion information of the current block among four merge candidates by using the assigned value.

If the number of available merge candidates is less than the maximum number, the number of merge candidates that the merge index can indicate may vary according to the number of available merge candidates. For example, when the maximum number of merge candidates is limited to 4 and the number of available merge candidates is 2, the number of merge candidates that the merge index can indicate may be 2.

The merge information may include residual information. In a merge mode, the residual information may indicate whether each of luma Y and chroma U and V component blocks includes a non-zero transform coefficient. The residual information may be represented with a Coded Block Flag (cbf). For example, residual information for a luma component may be represented with cbf_luma and residual information for a chroma component may be represented with each of cbf_chromaU and cbf_chromaV. Additionally, in a merge mode, entire residual information for a block on which an inter prediction is performed may be represented with merge_cbf, for example. Hereinafter, the entire residual information for a merge mode block may be referred to as merge residual information.

As one example, when merge_cbf is 1, the merge residual information may indicate that merge_flag=1, cbf_luma=0, cbf_chromaU=0, and cbf_chromaV=0. That is, when merge_cbf=1, the prediction mode for current block is a merge mode and a residual value for luma and chroma components may be derived as 0. Additionally, when merge_cbf=0, merge residual information may indicate a general merge mode not corresponding to when merge_cbf=1.

In the decoder, the merge residual information may be decoded before the merge flag is decoded. In this case, the encoder needs to generate merge residual information regardless of a value of the merge flag and then needs to transmit it to the decoder. However, even when the prediction mode of a current block is not a merge mode, merge residual information is generated and transmitted, so that the amount of transmission bits may be wasted.

Accordingly, when the prediction mode of a current mode is a merge mode, the encoder may generate merge residual information (for example, merge_cbf) and then may transmit it to the decoder, for example, only when merge_flag=1. At this point, the decoder may decode the merge flag first, and then may decode merge residual information only when the prediction mode of a current block is a merge mode. Accordingly, unnecessary overhead may be reduced.

Referring to FIG. 9 again, the encoder may encode the generated merge information in operation S920. Once the merge information is encoded, the encoder may transmit the encoded merge information to the decoder in operation S930.

In a CU merge, merge information including a merge flag and a merge index may be transmitted in a CU unit. In a PU merge, merge information including a merge flag and a merge index may be transmitted in a PU unit. Additionally, as mentioned above, if the prediction mode of a current block is not a merge mode, the encoder may not transmit merge residual information to the decoder.

Figure 10:
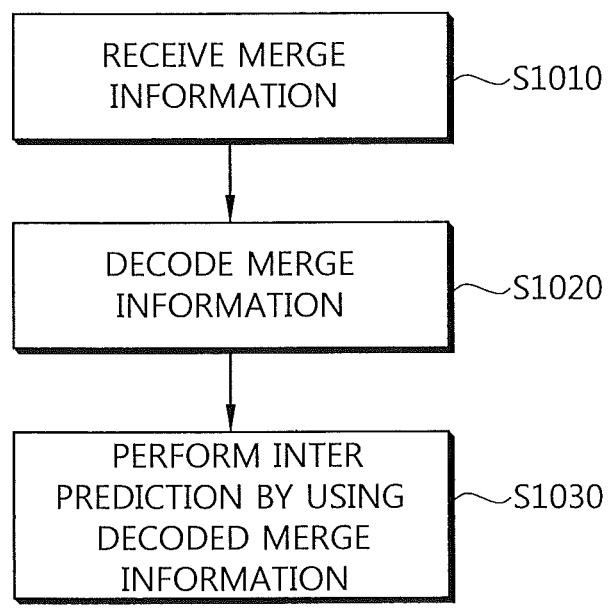
FIG. 10 is a conceptual diagram illustrating an inter prediction method in a decoder according to an embodiment of the present invention.

FIG. 10 is a conceptual diagram illustrating an inter prediction method in a decoder according to an embodiment of the present invention. The decoder may receive merge information and then perform inter prediction on a current block by using the received merge information.

Referring to FIG. 10, the decoder may receive merge information from the encoder in operation S1010. As mentioned above, in the embodiment of FIG. 9, the merge information may include a merge flag, a merge index, and residual information.

The merge flag may indicate whether the prediction mode of a current block is a merge mode, and the merge index may indicate with which neighboring block among adjacent neighboring blocks a current block is merged.

As mentioned above, the number of merge candidates that the merge index indicates may be differently set according to the number of merge candidates constituting a merge candidate list. When the maximum number of merge candidates constituting a merge candidate list is limited to below a predetermined number, the number of merge candidates that the merge index may indicate is set with the maximum number.

Specific embodiments of the merge flag and the merge index are identical to the embodiment of FIG. 9.

In a merge mode, the residual information may indicate whether each of luma Y and chroma U and V component blocks includes a non-zero transform coefficient. The residual information may be represented with a Coded Block Flag (cbf). In the merge mode, entire residual information on a block on which inter prediction is performed may be referred to as merge residual information, and specific embodiments of the merge residual information are identical to the embodiment of FIG. 9.

Referring to FIG. 10 again, the decoder may decode the received merge information in operation S1020.

The encoder may generate merge residual information regardless of a value of the merge flag and then may transmit it to the decoder. At this point, the decoder may decode the merge residual information before the merge flag is decoded.

The encoder may generate merge residual information and then may transmit it to the decoder only when the prediction mode of a current block is a merge mode. In this case, the decoder may decode the merge flag first, and then may decode the merge residual information only when the prediction mode of a current block is a merge mode. At this point, when the prediction mode of a current block is not a merge mode, merge residual information is not transmitted, so that the amount of transmission bits may be reduced.

The decoder may perform inter prediction by using the decoded merge information in operation S1030.

When the received merge flag from the encoder indicates that the prediction mode of a current block is a merge mode, the decoder may perform inter prediction in the merge mode. By using the merge index, the decoder may select a merge candidate used for deriving motion information of a current block among merge candidates constituting a merge candidate list. The decoder may derive motion information on a current block from the selected merge candidate and generate a prediction block by using the derived motion information.

At this point, when residual values for luma and chroma components are derived as 0 according to the merge residual information, the decoder may omit a decoding operation on the residual signal.

Meanwhile, the above-mentioned merge mode, skip mode, and direct mode may be combined and/or unified if necessary and then may be applied.

For example, the above merge mode may be similar to a direct mode in that motion information on a current block is derived from neighboring blocks adjacent to a current block and a residual signal is transmitted from an encoder to a decoder. Accordingly, the application of an unified merge and direct mode may be considered. Hereinafter, a mode in which the merge mode and the direct mode are unified into one is referred to as an unified merge/direct mode.

As another example, a method of unifying a skip mode and a merge mode and applying it may be considered. In the skip mode, in order to obtain motion information on a current block, the same method as that used in the merge mode may be used. At this point, in the skip mode and the merge mode, the same neighboring blocks may be used as candidate blocks for motion information derivation. For example, in the skip mode, motion information on a merge candidate block that a merge index indicates among merge candidates in a merge candidate list may be used as motion information on a current block as it is. In this case, the skip mode may be referred to as a merge skip mode.

As another example, a method of unifying the merge mode, the skip mode and the direct mode and applying it may be considered.

Hereinafter, an unified mode of the merge mode and the direct mode, an unified mode of the merge mode and the skip mode, and an unified mode of the merge mode, the skip mode, and the direct mode may be collectively referred to as an unified mode. Additionally, a candidate block used in the unified mode may be referred to as an unified mode candidate. Additionally, a list consisting of unified mode candidates may be referred to as an unified mode candidate list.

Figure 11:
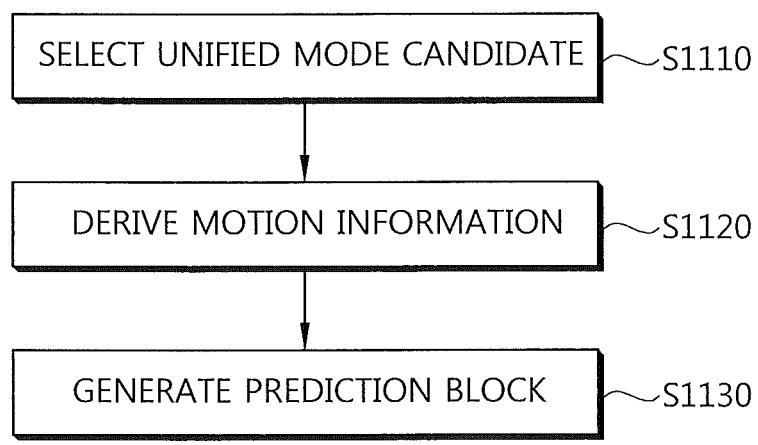
FIG. 11 is a flowchart illustrating an inter prediction method in an unified mode according to an embodiment of the present invention.

FIG. 11 is a flowchart illustrating an inter prediction method in an unified mode according to an embodiment of the present invention. The embodiment of FIG. 11 may be applied to an encoder and a decoder, and the decoder therein will be mainly described for convenience of description.

Referring to FIG. 11, a decoder may select an unified mode candidate used for deriving motion information of a current block among unified mode candidates constituting an unified mode candidate list in operation S1110. As one embodiment, in a merge skip mode, a decoder may select a merge candidate that a merge index transmitted from an encoder indicates as a candidate block used for deriving motion information of a current block. Embodiments of unified mode candidates in an unified mode candidate list may be identical to those of merge candidates shown in FIGS. 6 to 8.

The decoder may drive motion information on a current block by using the selected unified mode candidate in operation S1120.

As one embodiment, when an unified merge/direct mode is used, there may be an unified merge/direct mode in which a residual signal is transmitted and an unified merge/direct mode in which a residual signal is not transmitted. At this point, information on whether a residual signal is transmitted may be transmitted from an encoder to a decoder through an additional flag. For example, the flag may include residual_skip_flag or skip_flag.

In the unified merge/direct mode in which a residual signal is not transmitted, L0 motion information, L1 motion information, and/or bi motion information may be derived as motion information of a current block. That is, in the unified merge/direct mode in which a residual signal is not transmitted, L0 prediction, L1 prediction, and/or bi prediction may be performed.

At this point, a determination is adaptively made on which one of the L0 prediction, the L1 prediction, and the bi prediction is performed in an encoder and a decoder according to circumstances. For example, an encoder and a decoder may determine a prediction type and/or a prediction direction applied to a current block according to the types of motion information that a selected unified mode candidate has (for example, L0 motion information, L1 motion information, and bi motion information). As another example, information on which one of the L0 prediction, the L1 prediction, and the bi prediction is performed may be transmitted to a decoder. At this point, the decoder may determine a prediction type and/or a prediction direction applied to a current block by using the transmitted information from the encoder.

At this point, there may be an additional skip mode in which a residual signal is not transmitted. In a skip mode, a residual signal may not be transmitted always. At this point, only bi prediction may be always performed on a block which a skip mode is applied to.

When motion information on a current block is derived, the encoder may generate a prediction block for current block by using the derived motion information in operation S1130.

Figure 12:
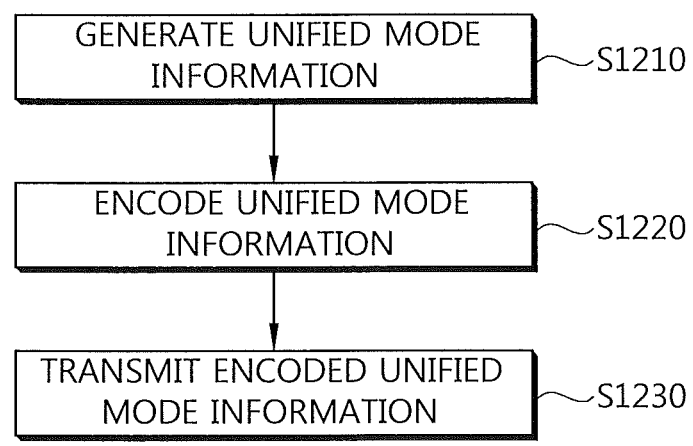
FIG. 12 is a conceptual diagram illustrating a method of transmitting unified mode information in an encoder according to an embodiment of the present invention.

FIG. 12 is a conceptual diagram illustrating a method of transmitting unified mode information in an encoder according to an embodiment of the present invention.

Referring to FIG. 12, the encoder may generate unified mode information in operation S1210.

The unified mode information may include information indicating whether a prediction mode for current block corresponds to the unified mode. Hereinafter, information indicating whether a prediction mode for current block corresponds to the unified mode is referred to as an unified mode flag.

The unified mode information may include residual information.

As one embodiment, when an unified merge/direct mode is used, as mentioned above, there may be an unified merge/direct mode in which a residual signal is transmitted and an unified merge/direct mode in which a residual signal is not transmitted. At this point, the residual information may correspond to information on whether a residual signal is transmitted.

For example, whether a residual signal is transmitted is indicated by a predetermined flag, and the flag may be represented with residual_skip_flag or skip_flag. When residual_skip_flag or skip_flag is 1, a luma component block and a chroma component block may not include a non-zero transform coefficient. That is, there may be no residual signal transmitted from an encoder to a decoder, with respect to a luma component and a chroma component. Here, residual information for a luma component may be represented with cbf_luma and residual information for a chroma component may be represented with each of cbf_chromaU and cbf_chromaV. When residual_skip_flag or skip_flag is 1, an encoder may not transmit a residual signal to a decoder.

When residual_skip_flag or skip_flag is 1, an encoder may not transmit a residual signal to a decoder, so that a decoding operation of a residual signal in the decoder may be omitted. At this point, the decoder may infer and/or consider that there is no residual signal for current block, and may derive all of a residual value (for example, cbf_luma) for a luma component and a residual value (for example, cbf_chromaU and cbf_chromaV) for a chroma component as 0.

In the decoder, the residual information may be decoded before the unified mode flag is decoded. In this case, the encoder needs to generate residual information regardless of a value of the unified mode flag and then needs to transmit it to the decoder, so that the amount of transmission bits may be wasted.

In order to reduce the amount of transmission bits, the encoder may generate residual information and then may transmit it to the decoder only when the prediction mode of a current block corresponds to the unified mode. At this point, the decoder may decode the merge flag first, and then may decode unified mode residual information only when the prediction mode of a current block corresponds to the unified mode.

In order to reduce the amount of bits used for transmission of residual information, a method of deriving residual information on a current block with reference to information on a neighboring block adjacent to a current block may be used. For example, when residual_skip_flag of all unified mode candidate blocks constituting an unified mode candidate list is 1 or residual_skip_flag of some unified mode candidate blocks is 1, residual_skip_flag of a current block may be derived as 1. When residual information on a current block is derived with reference to information on neighboring blocks, an encoder may not generate and transmit the residual information on the current block.

As another embodiment, when a merge skip mode is used or a merge mode, a skip mode, and a direct mode are all unified and used, an encoder may generate information on whether the prediction mode of a current block is a skip mode. At this point, residual information included in unified mode information may correspond to information on whether the prediction mode of a current block is a skip mode.

For example, the information on whether the prediction mode of a current block is a skip mode may be represented with residual_skip_flag or skip_flag. When residual_skip_flag or skip_flag is 1, it is inferred that there is no residual signal transmitted from an encoder to a decoder, and the decoder may omit a decoding operation of a residual signal.

Additionally, the above embodiments in an unified merge/direct mode may be applied to the cases that a merge skip mode is used and/or a merge mode, a skip mode, and a direct mode are all unified and used, if necessary.

Referring to FIG. 12 again, the encoder may encode the generated unified mode information in operation S1220. Once the unified mode information is encoded, the encoder may transmit the encoded unified mode information to the decoder in operation S1230.

Figure 13:
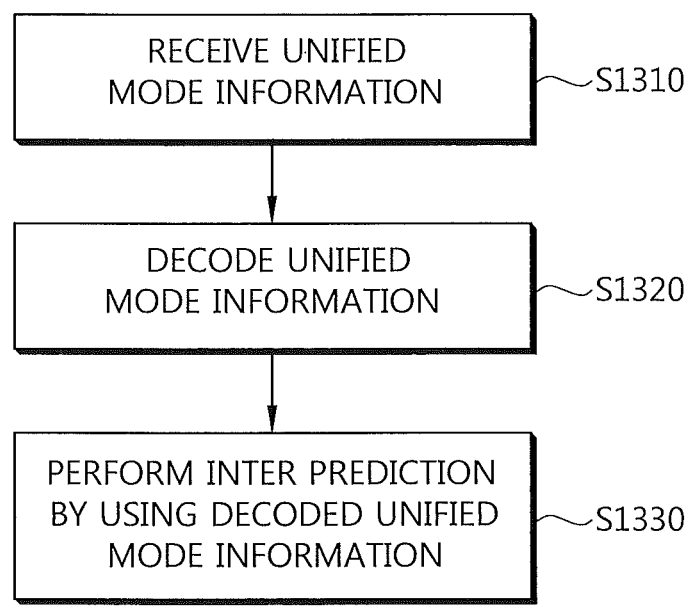
FIG. 13 is a conceptual diagram illustrating an inter prediction method in a decoder according to another embodiment of the present invention.

FIG. 13 is a conceptual diagram illustrating an inter prediction method in a decoder according to another embodiment of the present invention. The decoder may receive unified mode information and then perform inter prediction on a current block by using the received unified mode information.

Referring to FIG. 13, the decoder may receive unified mode information from the encoder in operation S1310. As mentioned in the embodiment of FIG. 12, the unified mode information may include an unified mode flag and residual information.

The unified mode flag may indicate whether a prediction mode for current block corresponds to the unified mode.

When an unified merge/direct mode is used, as mentioned above, there may be an unified merge/direct mode in which a residual signal is transmitted and an unified merge/direct mode in which a residual signal is not transmitted. At this point, the residual information may correspond to information on whether a residual signal is transmitted.

When a merge skip mode is used or a merge mode, a skip mode, and a direct mode are all unified and used, an encoder may generate information on whether the prediction mode of a current block is a skip mode. At this point, residual information in unified mode information may correspond to information on whether the prediction mode of a current block is a skip mode.

Specific embodiments of the unified mode flag and the residual information are identical to the embodiment of FIG. 12.

Referring to FIG. 13 again, the decoder may decode the received unified mode information in operation S1320.

When an unified merge/direct mode is used, information on whether a residual signal is transmitted may be transmitted from an encoder to a decoder through an additional flag. The flag may be represented with residual_skip_flag or skip_flag. At this point, the decoder may decode the flag information and may determine according to the decoded flag information whether it is an unified merge/direct mode in which a residual signal is transmitted or an unified merge/direct mode in which a residual signal is not transmitted.

When the unified merge/direct mode is used, the unified merge/direct mode having residual and the unified merge/direct mode having no residual may be treated in the same way, except for a decoding operation that depends on residual. For example, in the unified merge/direct mode having no residual, an unified mode candidates constituting an unified mode candidate list may be identical to an unified merge/direct mode having residual. Accordingly, the decoder may use the same unified mode candidate for motion derivation regardless of whether there is residual. At this point, as mentioned in the embodiment of FIG. 11, embodiments of unified mode candidates in an unified mode candidate list may be identical to those of merge candidates shown in FIGS. 6 to 8.

However, in the unified merge/direct mode in which a residual signal is not transmitted, there is no residual signal transmitted to the decoder, so that the decoder may omit an operation for decoding a residual signal. For example, when residual_skip_flag or skip_flag is 1, it is inferred and/or regarded that there is no residual signal, so that the decoder may omit a decoding operation of a residual signal. When residual_skip_flag or skip_flag is 1, the decoder derives all of a residual value (for example, cbf_luma) for a luma component and a residual value (for example, cbf_chromaU and cbf_chromaV) for a chroma component as 0. At this point, the decoder may also omit a decoding operation of a residual signal.

The encoder may generate merge residual information regardless of a value of the unified mode flag and then may transmit it to the decoder. At this point, the decoder may decode the residual information before the unified mode flag is decoded.

The encoder may generate merge residual information and then may transmit it to the decoder only when the prediction mode of a current block corresponds to the unified mode. At this point, the decoder may decode the unified mode flag first, and then may decode unified mode residual information only when the prediction mode of a current block corresponds to the unified mode.

As mentioned in the embodiment of FIG. 12, the decoder may drive residual information on a current block with reference to information on a neighboring block. When residual information on a current block is derived with reference to information on a neighboring block, an encoder may not generate and transmit the residual information on the current block. Accordingly, the amount of information transmitted from the encoder to the decoder may be reduced. The embodiment in which residual information on a current block is derived using information on a neighboring block was described with reference to FIG. 12.

When a merge skip mode is used or a merge mode, a skip mode, and a direct mode are all unified and used, information on whether the prediction mode of a current mode is the skip mode may be represented with residual_skip_flag of skip_flag. When residual_skip_flag or skip_flag is 1, it is inferred that there is no residual signal transmitted from an encoder to a decoder, and the decoder may omit a decoding operation of a residual signal.

Additionally, the embodiments in an unified merge/direct mode may be applied to the cases that a merge skip mode is used and/or a merge mode, a skip mode, and a direct mode are all unified and used, if necessary.

Referring to FIG. 13 again, the decoder may perform inter prediction by using the decoded unified mode information in operation S1330.

The above-mentioned embodiments of FIGS. 11 to 13 are described from an unified mode perspective, and if necessary, may be applied to a prediction mode which is not the unified mode. For example, they may be applied to a merge mode.

In the above embodiments, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The invention claimed is:

1. A video decoding method performed by a decoding apparatus, comprising:
receiving mode information on an inter prediction of a current block and residual information, wherein the mode information includes merge flag information indicating whether an inter prediction mode for the current block is a merge mode;
deriving merge candidates of the current block based on neighboring blocks of the current block;
selecting a merge candidate from the derived merge candidates;
determining a motion vector of the current block as to be equal to a motion vector of the selected merge candidate;
generating a prediction sample of the current block based on the motion vector of the current block; and
generating a residual sample of the current block based on the residual information,
wherein the neighboring blocks includes a left neighboring block, an upper neighboring block, an upper-right corner neighboring block, an upper-left corner neighboring block, and a lower-left corner neighboring block of the current block.

2. The method of claim 1, wherein the mode information includes residual flag information indicating whether there is the residual information for the current block, and
wherein the residual flag information is received prior to the merge flag information.

3. The method of claim 2, wherein the merge candidates has the same configuration regardless whether there is the residual information for the current block.

4. The method of claim 2, wherein the derived motion vector is one of L0 motion vector for forward prediction, L1 motion vector for backward prediction, and Bi motion vector for bi prediction.

5. The method of claim 2, wherein decoding the received mode information comprises:
decoding the merge flag information prior to the residual flag information; and
decoding the residual flag information only when the decoded merge flag information indicates that the inter prediction mode for the current block is the merge mode.

6. The method of claim 1, wherein the left neighboring block is a bottom-most block among left neighboring blocks adjacent to the left boundary of the current block, and the top neighboring block is a right-most block among upper neighboring blocks adjacent to the upper boundary of the current block.

7. The method of claim 1, wherein the neighboring blocks further includes a temporal neighboring block which is a block corresponding to the current block and located in a reference picture.

8. A video decoding apparatus, comprising:
an entropy decoder configured to receive mode information on an inter prediction of a current block and residual information, wherein the mode information includes merge flag information indicating whether an inter prediction mode for the current block is a merge mode;

a predictor configured to derive merge candidates of the current block based on neighboring blocks of the current block, to select a merge candidate from the derived merge candidates, to determine a motion vector of the current block as to be equal to a motion vector of the selected merge candidate, and to generate a prediction sample of the current block based on the motion vector of the current block; and an inverse transformer configured to generating a residual sample of the current block, wherein the residual sample is generated based on the residual information, wherein the neighboring blocks includes a left neighboring block, an upper neighboring block, an upper-right corner neighboring block, an upper-left corner neighboring block, and a lower-left corner neighboring block of the current block.

9. The apparatus of claim 8, wherein the mode information includes residual flag information indicating whether there is the residual information for the current block, and wherein the residual flag information is received prior to the merge flag information.

10. The apparatus of claim 9, wherein the merge candidates has the same configuration regardless whether there is the residual information for the current block.

11. The apparatus of claim 9, wherein the derived motion vector is one of L0 motion vector for forward prediction, L1 motion vector for backward prediction, and Bi motion vector for bi prediction.

12. The apparatus of claim 9, wherein decoding the received mode information comprises:

decoding the merge flag information prior to the residual flag information; and decoding the residual flag information only when the decoded merge flag information indicates that the inter prediction mode for the current block is the merge mode.

13. The apparatus of claim 8, wherein the left neighboring block is a bottom-most block among left neighboring blocks adjacent to the left boundary of the current block, and the top neighboring block is a right-most block among upper neighboring blocks adjacent to the upper boundary of the current block.

14. The apparatus of claim 8, wherein the neighboring blocks further includes a temporal neighboring block which is a block corresponding to the current block and located in a reference picture.

* * * * *